US011348370B2

(12) United States Patent
Shibata et al.

(10) Patent No.: US 11,348,370 B2
(45) Date of Patent: May 31, 2022

(54) IRIS AUTHENTICATION DEVICE, IRIS AUTHENTICATION METHOD, AND RECORDING MEDIUM

(71) Applicant: NEC Corporation, Tokyo (JP)

(72) Inventors: Takashi Shibata, Tokyo (JP); Shoji Yachida, Tokyo (JP); Chisato Funayama, Tokyo (JP); Masato Tsukada, Tokyo (JP); Yuka Ogino, Tokyo (JP); Keiichi Chono, Tokyo (JP); Emi Kitagawa, Tokyo (JP); Yasuhiko Yoshida, Tokyo (JP); Yusuke Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/283,050

(22) PCT Filed: Oct. 16, 2018

(86) PCT No.: PCT/JP2018/038396
§ 371 (c)(1),
(2) Date: Apr. 6, 2021

(87) PCT Pub. No.: WO2020/079741
PCT Pub. Date: Apr. 23, 2020

(65) Prior Publication Data
US 2021/0350126 A1    Nov. 11, 2021

(51) Int. Cl.
*G06V 40/18* (2022.01)
*G06V 10/22* (2022.01)
(Continued)

(52) U.S. Cl.
CPC ............ *G06V 40/197* (2022.01); *G06V 10/22* (2022.01); *G06V 10/60* (2022.01); *G06V 40/103* (2022.01);
(Continued)

(58) Field of Classification Search
None
See application file for complete search history.

(56) References Cited

U.S. PATENT DOCUMENTS

2007/0019882 A1* 1/2007 Tanaka ................... G06T 17/20
382/276
2009/0237208 A1   9/2009 Tsukahara et al.
(Continued)

FOREIGN PATENT DOCUMENTS

| JP | 2005-227933 A | 8/2005 |
| JP | 2006-212185 A | 8/2006 |
| WO | 2009/016846 A1 | 2/2009 |

OTHER PUBLICATIONS

Extended European Search Report for EP Application No. 18937158.6 dated Sep. 28, 2021.
(Continued)

*Primary Examiner* — Edward Park
(74) *Attorney, Agent, or Firm* — Sughrue Mion, PLLC

(57) ABSTRACT

The disclosure is inputting a first image captured an image of an authentication target; inputting a second image captured an image of a right eye or a left eye of the target; determining whether the second image is of a left eye or a right eye of the target based on information including the first image, and outputting a determination result as left/right information in association with the second image; detecting an overlap between a region including the second image and a predetermined region in the first image; calculating a verification score by comparing characteristic information that are related to the left/right information with iris characteristic information calculated from the second image, and calculating a first weighted verification score obtained by weighting the verification score with a detection result; and authenticating a target in the second image based on the first
(Continued)

weighted verification score, and outputting an authentication result.

14 Claims, 15 Drawing Sheets

(51) Int. Cl.
*G06V 10/60* (2022.01)
*G06V 40/19* (2022.01)
*G06V 40/20* (2022.01)
*G06V 40/70* (2022.01)
*G06V 40/10* (2022.01)
*G06V 40/16* (2022.01)

(52) U.S. Cl.
CPC ............ *G06V 40/172* (2022.01); *G06V 40/19* (2022.01); *G06V 40/25* (2022.01); *G06V 40/70* (2022.01)

(56) References Cited

U.S. PATENT DOCUMENTS

2009/0285457 A1* 11/2009 Matsuzaka ......... H04N 5/23219
382/118
2021/0350126 A1* 11/2021 Shibata ................ G06V 40/197

OTHER PUBLICATIONS

Shin Kwang Yong et al: "New iris recognition method for noisy iris images", Pattern Recognition Letters, vol. 33, No. 8, Jun. 1, 2012, pp. 991-999, XP028910621.
International Search Report of PCT Application No. PCT/JP2018/038396 dated Jan. 22, 2019.
English translation of Written opinion for PCT Application No. PCT/JP2018/038396, dated Jan. 22, 2019.

* cited by examiner

Fig.12

| | ID | 1 | 2 | 3 | ... |
|---|---|---|---|---|---|
| RIGHT | CHARACTERISTIC INFORMATION | | | | ... |
| | RELIABILITY SCORE | 80% | 40% | 10% | ... |
| LEFT | CHARACTERISTIC INFORMATION | | | | ... |
| | RELIABILITY SCORE | 20% | 60% | 90% | ... |

| AUTHENTICATION ID | AUTHENTICATION TIME | AUTHENTICATION RESULT | AUTHENTICATION IMAGE DATA |
|---|---|---|---|
| 1 | 07:05:55 | ○ | A |
| 2 | 10:13:05 | 1234 | B |
| 3 | 12:41:23 | ○ | C |
| 4 | 15:30:40 | × | D |
| 5 | 19:08:15 | 5678 | E |

IRIS AUTHENTICATION DEVICE, IRIS AUTHENTICATION METHOD, AND RECORDING MEDIUM

This application is a National Stage Entry of PCT/JP2018/038396 filed on Oct. 16, 2018, the contents of all of which are incorporated herein by reference, in their entirety.

TECHNICAL FIELD

The example embodiments relates to an iris authentication device and the like for authenticating a target.

BACKGROUND ART

Personal authentication based on an individual difference of a living body (biometrics-based authentication) has a lower risk of leakage and theft than a password or the like created by a user. Therefore, for the purpose of identifying individuals and confirming rights, and for the purpose of protecting security, a case of introducing individual authentication based on an individual difference of a living body increases. As a personal authentication technology based on an individual difference of a living body, there is known a technology using a fingerprint, a vein, a face, an iris, voice, or the like as biometric information.

Among them, iris authentication has high authentication accuracy. The reason for this is because an iris pattern is more complicated than a fingerprint, and is certainly different for every person. Furthermore, once an iris pattern is completed, there is no change or deterioration thereafter. Unlike a fingerprint, an iris pattern can be recognized without contact, and forgery is difficult. In addition, even the same person has a different iris pattern between the right eye and the left eye.

However, when the iris authentication is performed, since an iris pattern is different between the right eye and the left eye as described above, it is necessary to identify the left and right eyes. For this identification, for example, there is a technique for identifying the left and right eyes by using a shape of an inner corner of the eye near the iris (see PTL 1). In addition to this, PTL 2 discloses a technique related to an iris authentication device.

CITATION LIST

Patent Literature

[PTL 1] JP 2005-227933 A
[PTL 2] WO 2009/016846 A

SUMMARY

Technical Problem

However, it is not always possible to identify left and right eyes on the basis of an inner corner of the eye, which is a part of the face. For example, at a time of capturing an image of a face of a user to be authenticated, it may not be possible to accurately capture an image of the inner corner of the eye when dark shadows appear on the face, strong light is applied on the face, a shape of the inner corner of the eye changes depending on a facial expression, or the inner corner of the eye is covered by hair or glasses, and the like. Further, in order to capture an image of the inner corner of the eye in detail from a distance, a telephotographic camera with a high magnification and an image analyzing apparatus with high accuracy are required, which increases cost.

The disclosure has been made in view of the above problems, and one object is to provide an iris authentication device and the like for performing iris authentication with high accuracy by reliably identifying left and right eyes.

Solution to Problem

In view of the above problems, an iris authentication device according to a first aspect of the disclosure includes:

a first image input means for inputting a first image obtained by capturing an image of an authentication target that moves in a specific direction;

a second image input means for inputting, for at least one eye, a second image obtained by capturing an image of a right eye or a left eye of the target;

a determination means for determining whether the second image is of a left eye or a right eye of the target on the basis of information including the first image, and outputting a determination result as left/right information in association with the second image;

a detection means for detecting an overlap between a region including the second image and a predetermined region in the first image;

a storage means for storing iris characteristic information of a right eye and a left eye relating to one or more targets to be authenticated;

a score calculation means for calculating a verification score by comparing iris characteristic information calculated from the second image associated to the left/right information, with one or more pieces of characteristic information that are stored in the storage means and related to the left/right information, and calculating a first weighted verification score obtained by weighting the calculated verification score with a result of the detection; and an authentication means for authenticating a target captured in the second image on the basis of the calculated first weighted verification score, and outputting an authentication result.

An iris authentication method according to a second aspect of the disclosure includes:

inputting a first image obtained by capturing an image of an authentication target that moves in a specific direction;

inputting, for at least one eye, a second image obtained by capturing an image of a right eye or a left eye of the target;

determining whether the second image is of a left eye or a right eye of the target on the basis of information including the first image, and outputting a determination result as left/right information in association with the second image;

detecting an overlap between a region including the second image and a predetermined region in the first image;

calculating a verification score by comparing one or more pieces of characteristic information that are related to the left/right information and acquired from a storage means for storing iris characteristic information of a right eye and a left eye relating to one or more targets to be authenticated, with iris characteristic information calculated from the second image associated to the left/right information, and calculating a first weighted verification score obtained by weighting the calculated verification score with a result of the detection; and authenticating a target captured in the second image on the basis of the calculated first weighted verification score, and outputting an authentication result.

An iris authentication program according to a third aspect of the disclosure causes a computer to enable:

inputting a first image obtained by capturing an image of an authentication target that moves in a specific direction;

inputting, for at least one eye, a second image obtained by capturing an image of a right eye or a left eye of the target;

determining whether the second image is of a left eye or a right eye of the target on the basis of information including the first image, and outputting a determination result as left/right information in association with the second image;

detecting an overlap between a region including the second image and a predetermined region in the first image;

calculating a verification score by comparing one or more pieces of characteristic information that are related to the left/right information and acquired from a storage means for storing iris characteristic information of a right eye and a left eye relating to one or more targets to be authenticated, with iris characteristic information calculated from the second image associated to the left/right information, and calculating a first weighted verification score obtained by weighting the calculated verification score with a result of the detection; and authenticating a target captured in the second image on the basis of the calculated first weighted verification score, and outputting an authentication result.

The iris authentication program may be stored in a recording medium.

BRIEF DESCRIPTION OF DRAWINGS

FIG. 12 is a view showing a configuration example of data stored in a storage unit.

FIG. 17 is a view showing a configuration example of data stored in an authentication result storage unit.

EXAMPLE EMBODIMENT

Figure 1:
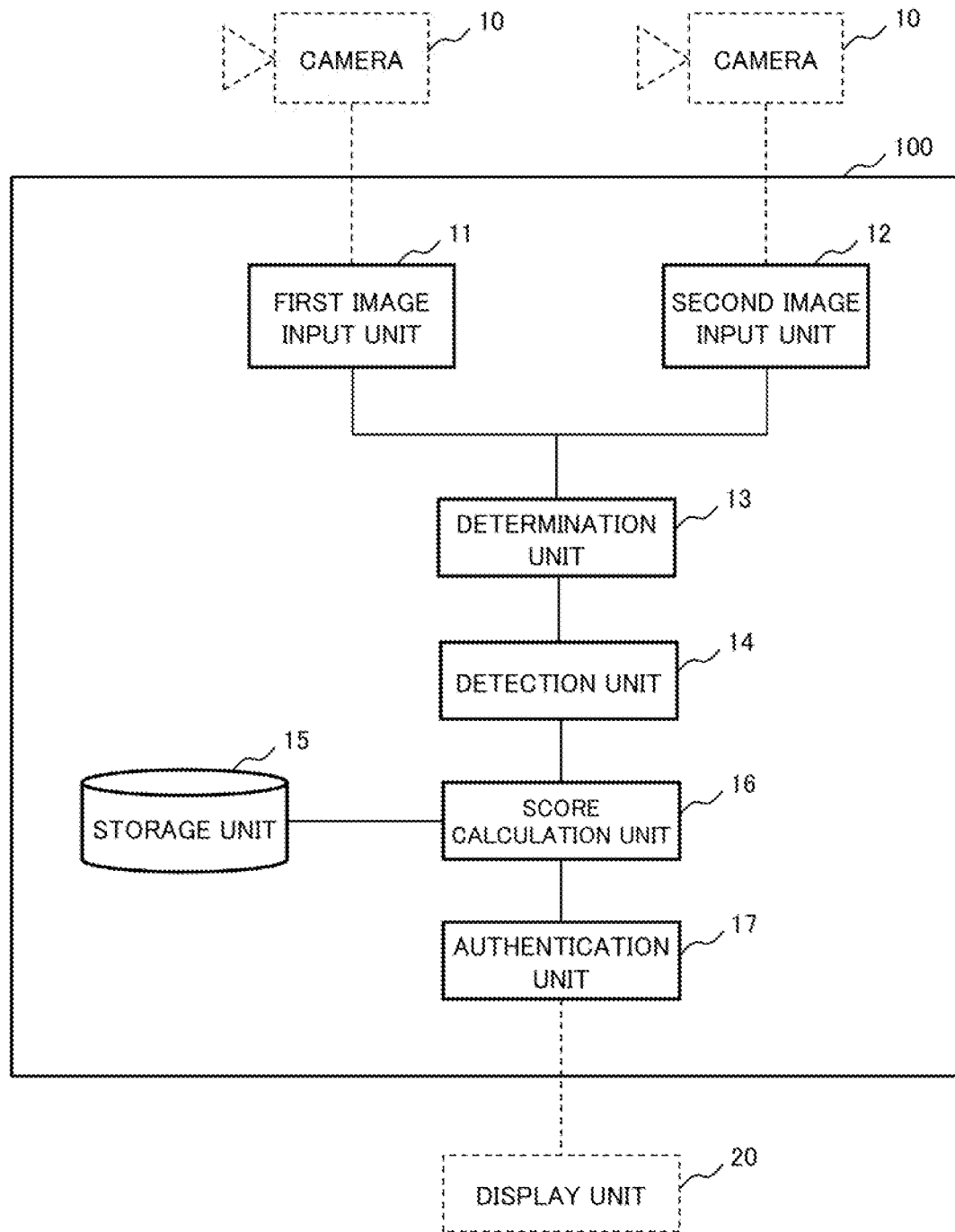
FIG. 1 is an example diagram of a configuration of an iris authentication device according to a first example embodiment of the disclosure.

Hereinafter, each example embodiment will be described in detail with reference to the drawings. In the description of the drawings below, same or similar reference numerals are given to same or similar parts. However, the drawings schematically illustrate a configuration in the example embodiments. Further, the example embodiments described below are merely examples, and may be modified as appropriate to the extent of being essentially the same.

First Example Embodiment

Examples of information for biometric authentication include a plurality of pieces of information such as an ultrasound graph, an image of a living body, or audio data. In the following description, an image (specifically, an iris image) are mainly used as an example, but this is not intended to limit the example embodiments.

In each example embodiment, an authentication target is mainly a living body, and includes a person (a user), an animal, and the like. As the authentication target, a thing other than the living body, such as a mannequin, for example, may be included. When iris authentication is performed, left and right eyes (including artificial eyes for the purpose of impersonation) of the target are authenticated. In the following description of the example embodiments, the authentication target is also referred to as a "target user".

Iris Authentication Device

As shown in FIG. 1, an iris authentication device 100 includes a first image input unit 11, a second image input unit 12, a determination unit 13, a detection unit 14, a storage unit 15, a score calculation unit 16, and an authentication unit 17.

Figure 2:
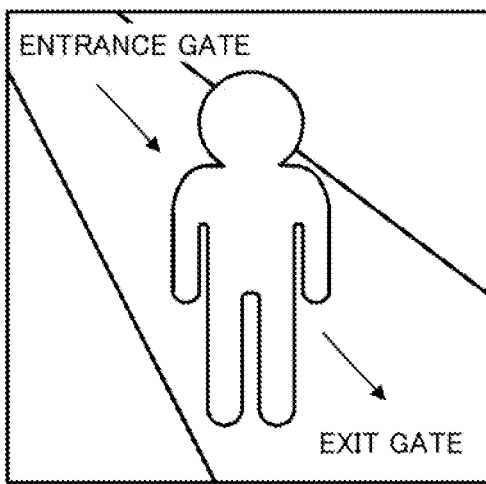
FIG. 2 is an example view of an image of a target user moving in a specific direction.

The first image input unit 11 and the second image input unit 12 are connected to a camera 10. The camera 10 is a camera to capture an image of a user to be authenticated. There may be one or a plurality of cameras 10. The camera 10 captures an image of a user moving in a specific direction. Moving in a specific direction means, for example, that the user walks from an entrance gate to an exit gate of an authentication execution area, in a case of walk-through authentication (referring to performing biometric authentication while an authentication target user is moving without stopping). The user moving in a specific direction is captured by the camera 10 as an image shown in FIG. 2, for example. Although an image of a whole body is captured in FIG. 2, this may be an image of a face or the like. The camera 10 is fixed at a position where the image as shown in FIG. 2 can be captured (a wall, a gate, or the like). Among the images captured by the camera 10, image data of a region including the whole body of the user is inputted as a first image to the first image input unit 11, while image data of a region including a periphery of left and right eyes of the user is inputted as a second image to the second image input unit 12. Processing for selecting the image region may be performed by the first image input unit 11 and the second image input unit 12 that have received the image from the camera 10. After the camera 10 performs the processing, the first image input unit 11 and the second image input unit 12 may input the image of the selected image region.

The first image input unit 11 inputs, from the camera 10, the first image (see FIG. 3) obtained by capturing, at a particular location, an image of the region including the whole body of the user moving in the specific direction. The first image may be a face image of the user.

Figure 3:
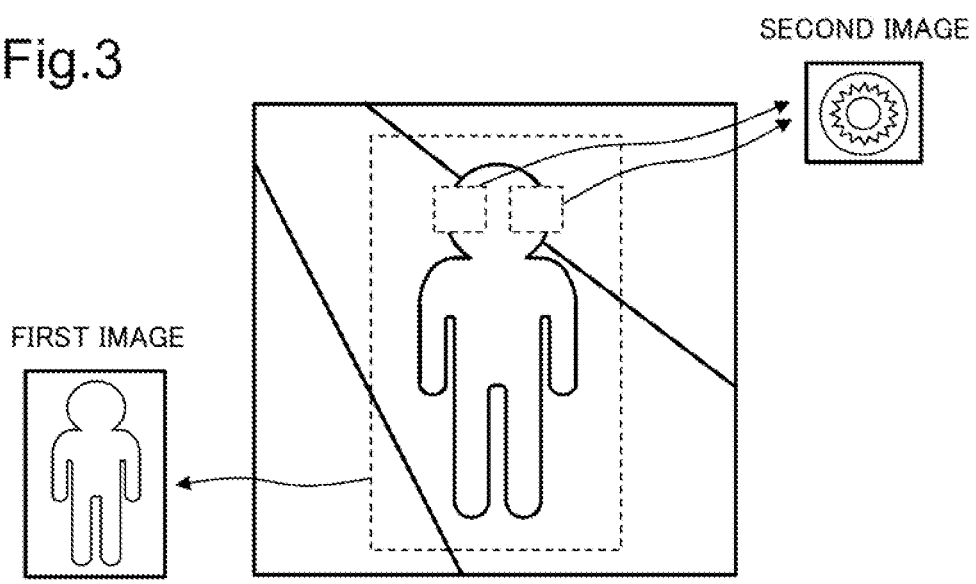
FIG. 3 is an example view of a first image and a second image acquired from the image of the target user.

The second image input unit 12 inputs, from the camera 10, the second image (see FIG. 3) obtained by capturing an image of at least one of a right eye and a left eye of the user moving in the specific direction. The second image input unit 12 preferably inputs an image for both eyes. However, if the camera 10 is unable to obtain an image of one eye (for example, such as being unable to capture an image due to blocking with bangs or being unable to capture an image due to reflection of glasses), an image is captured for the other eye that can be captured. In FIG. 3, as an example, the camera 10 uses a region of the right and left eyes in the whole body image (the first image) of the user to be captured as the second image, but the region of the left and right eyes may be magnified by a telephoto lens and captured.

Figure 4:
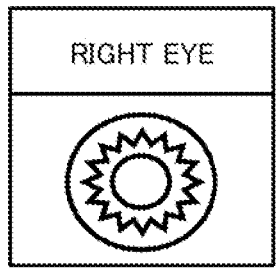
FIG. 4 is an example view of the second image associated with left/right information.

The determination unit 13 determines whether the second image is of the left eye or the right eye of the user on the basis of information including the first image, and outputs left/right information indicating a determination result in association with the second image (see FIG. 4). As will be described later, the determination unit 13 outputs an image of an iris part as shown in FIG. 4. In the example embodiment, one of the following two methods is used as an example of the determination of the left and right eyes. As a first method, the determination unit 13 determines whether the second image is of the left eye or the right eye of the user by applying, in a region of the user's face in the first image, a predetermined template for detecting a contour of the face and a positional relationship of both eyes and the like to perform matching processing, and specifying a region including the left eye and the right eye of the target user. In order to detect the positional relationship of both eyes, the user's face needs to face a front side with respect to the camera 10. However, by setting the camera 10 in advance at a position where the image of the user moving toward a predetermined traveling direction can be captured, the user facing the front side with respect to the camera 10 can be inevitably made a target of the determination. As a second method, the determination unit 13 determines whether the second image is relevant to the left eye or the right eye of the user, by comparing a pixel in a region of right and left eyes of the user in the first image with a pixel in a region of right or left eye of the user in the second image. In this case, as shown in FIG. 3, the determination unit 13 extracts a pixel of each region of right eye and the left eye of the user in the first image, which is an image of a whole body, and compares the extracted pixels with a pixel in a region of eye captured in the second image, and determines which of the right and left eyes is captured in the second image in accordance with the similarity of the compared pixels. For the comparison of pixels, a contour tracking algorithm using a chain code, a principal component analysis method, a three-dimensional phase only correlation, or the like may be used. A method of determining the left and right eyes is not limited to the above methods.

Meanwhile, the first image and the second image may be captured at the same timing by using two cameras 10. At this time, the camera to capture an image of the second image may be a telephoto camera capable of capturing an image with a high magnification. Further, the first image and the second image may be captured at different timings by using the same camera 10. At this time, it is preferable that the camera 10 can quickly switch the magnification of the telephoto function for capturing the first image and the second image of the subject.

Figure 5:
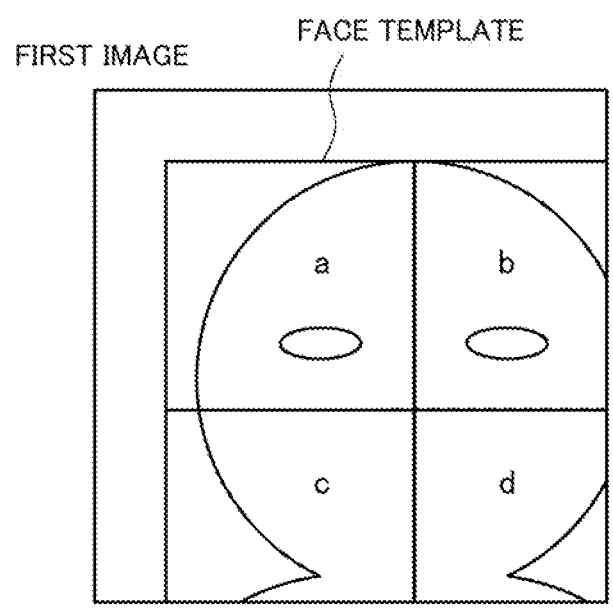
FIG. 5 is an example view of a face template to be applied to the target user.
Figure 6:
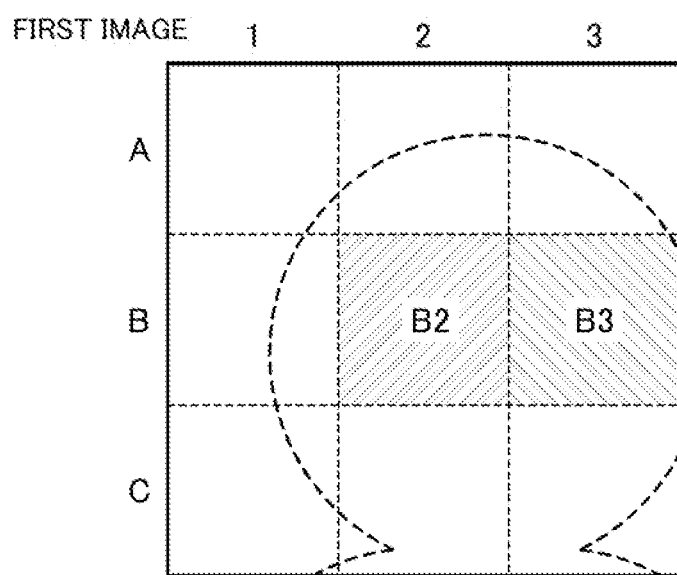
FIG. 6 is an example view showing a first image region divided into a plurality of rectangular regions.
Figure 7:
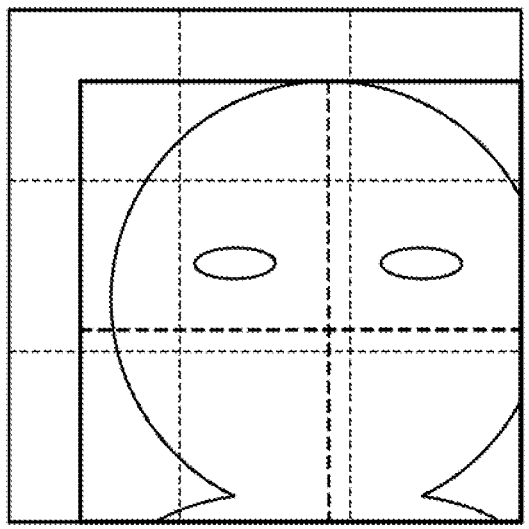
FIG. 7 is an example view showing an overlap degree between the face template and the first image region.
Figure 8:
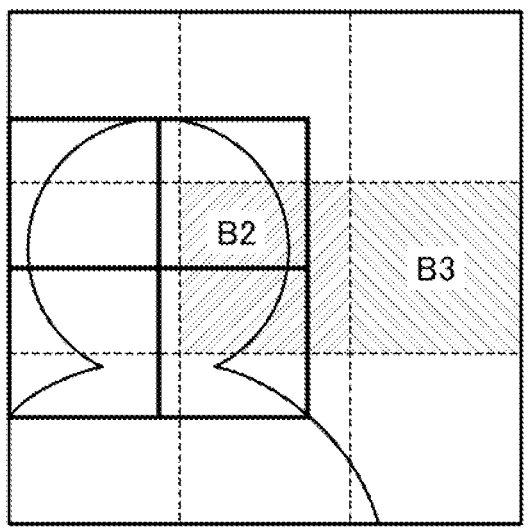
FIG. 8 is an example view showing an overlap degree between the face template and the first image region.
Figure 9:
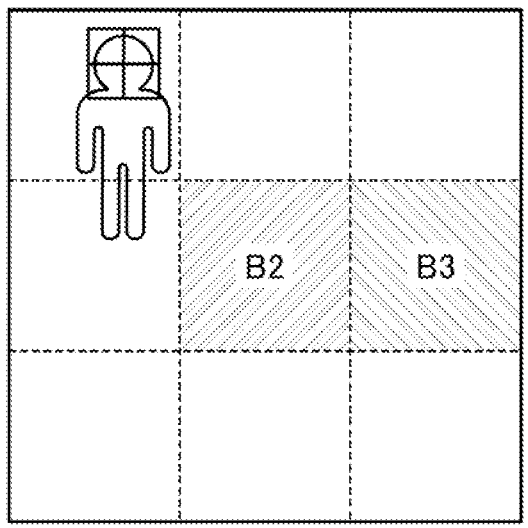
FIG. 9 is an example view showing an overlap degree between the face template and the first image region.

The detection unit 14 detects an overlap between a region including the second image and a predetermined region in the first image. For example, the camera 10 fixed at a certain place captures an image of the user. Here, the determination unit 13 applies, to the first image, a face template for determining positions of the left and right eyes from the contour of the user's face and the like, and specifies a region (the region including the second image) including the left eye and the right eye of the target user included in the first image. In the example shown in FIG. 5, in the face template in the first image, the specified region including the right eye of the target user is a, and the specified region including the left eye of the target user is b. It is assumed that the first image is divided in advance into rectangular regions as shown in FIG. 6 by a designer or the like. At this time, when the camera 10 at the predetermined position captures an image of the moving target user, it is presumed that the right eye is included in a rectangular region B2 and the left eye is included in a rectangular region B3, and the regions are set in advance (these rectangular regions are set as predetermined regions in the first image). This can be achieved, for example, by causing a machine learning engine to learn a plurality of images of the target user at a certain position as teacher data in advance. In this example, as shown in FIG. 6, it is assumed that, as a result of learning, the region of the right eye of the target user shown in the first image is included in the rectangular region B2, and the region of the left eye is included in the rectangular region B3. In this case, as shown in FIG. 7, the detection unit 14 superimposes the face template and the divided first image, and detects whether the region a of the right eye in the face template overlaps with the rectangular region B2 where the right eye should be present in the first image, and similarly detects whether the region b of the left eye in the face template overlaps with the rectangular region B3 where the left eye should be present in the first image. The detection unit 14 outputs, as a detection result, to the score calculation unit 16 that the left and right eyes overlap at an appropriate position. When no overlap is detected, for example, when the left and right eyes of the face template overlap with only a part of the rectangular region (B2, B3) where the left and right eyes should be present in the first image (see FIG. 8), or when the image of the target user is small and the face template and the rectangular region (B2, B3) do not overlap at all (see FIG. 9), the detection unit 14 outputs, as a detection result, to the score calculation unit 16 that the left and right eyes do not overlap at an appropriate position.

The storage unit 15 stores iris characteristic information of a right eye and iris characteristic information of a left eye, of a plurality of users. Meanwhile, the iris characteristic information is, for example, an iris code (see characteristic information of FIG. 12) generated on the basis of the Daugman's algorithm.

The score calculation unit 16 calculates the iris characteristic information from the second image (see FIG. 4) associated with the left/right information, and calculates a first weighted verification score obtained by weighting the calculated verification score with a detection result. As an example, a case of using an iris code as the iris characteristic information will be described. The score calculation unit 16 specifies a boundary line of an iris from an image of the iris received from the determination unit 13, to extract an iris part. Further, the score calculation unit 16 applies a two-dimensional Gabor filter to information of the extracted iris part to encode an iris pattern, and generates an iris code. The iris code is, for example, a 2048 bit digital encoding code.

Here, the second image associated with the left/right information refers to an iris image determined to be the right eye by the determination unit 13 and tagged as "right eye", or an iris image determined to be the left eye by the determination unit 13 and tagged as "left eye" (see FIG. 4). The iris code may be tagged with any one of the left and right eyes.

The score calculation unit 16 compares the calculated characteristic information with characteristic information of a plurality of users related to the left/right information stored in the storage unit 15. Specifically, the score calculation unit 16 compares with characteristic information of only a right eye stored in the storage unit 15 for an iris image tagged as right eye, and compares with characteristic information of only a left eye stored in the storage unit 15 for an iris image tagged as left eye. The score calculation unit 16 obtains a verification score as a result of the comparison. The verification score is a value obtained as a result of calculating the number of bits different between the iris code of the target user and the iris code registered in the storage unit 15 (calculating a hamming distance). The score calculation unit 16 weights the detection result by the detection unit 14 to the verification score, to calculate the first weighted verification score. For example, when the detection unit 14 detects that a region including the left eye and a region including the right eye specified with the template is overlapped with the region of the left and right eyes in the divided first image (both eyes overlap at an appropriate position), for example, a calculation result is obtained by multiplying and adding a predetermined value to the verification score, or substituting into a predetermined formula, in order to increase the value of the verification score. In addition, the score calculation unit 16 may weight so as to reduce the verification score, when the score calculation unit 16 receives a detection result that the left and right eyes do not overlap at an appropriate position.

The authentication unit 17 receives the first weighted verification score from the score calculation unit 16, and authenticates the user captured in the first image and the second image as a registered user (a legitimate user), for example, when the first weighted verification score is equal to or greater than a predetermined threshold value, and authenticates the user captured in the first image and the second image as not a registered user when the first weighted verification score is equal to or less than a predetermined threshold value. The authentication unit 17 outputs an authentication result to an external display unit 20. The display unit 20 is a liquid crystal display or the like, and can display such that the target user or an administrator of the authentication execution area can browse the authentication result. In addition, the authentication result may be made known by voice notification with a speaker or a buzzer, lamp lighting, or the like.

Operation of Iris Authentication Device

An operation of the iris authentication device 100 according to the first example embodiment will be described with reference to a flowchart of FIG. 10. It is assumed that the storage unit 15 stores, in advance, iris characteristic information of a right eye and a left eye relating to a plurality of users that may be the authentication target.

In step S101, the first image input unit 11 inputs a first image obtained by capturing an image of the authentication target user moving in a specific direction. The second image input unit 12 inputs, for at least one eye, the second image obtained by capturing an image of the right eye or the left eye of the target user.

In step S102, the determination unit 13 determines whether a second image is of a left eye or a right eye of the target user on the basis of information including the first image, and outputs left/right information indicating a determination result in association with the second image.

In step S103, the detection unit 14 detects an overlap between a region including the second image and a predetermined region in the first image.

In step S104, the score calculation unit 16 calculates a verification score obtained by comparing iris characteristic information calculated from the second image associated with the left/right information, with one or more pieces of characteristic information related to the left/right information and stored in the storage unit 15. The score calculation unit 16 weights the verification score with a detection result, to calculate the first weighted verification score.

In step S105, the authentication unit 17 authenticates the user captured in the first image and the second image on the basis of the calculated first weighted verification score, and outputs an authentication result.

Thus, the operation of the iris authentication device 100 is ended.

Effect of First Example Embodiment

According to the first example embodiment, iris authentication can be performed by reliably identifying left and right eyes. The reason for this is because the determination unit 13 determines whether the second image is of a left eye or a right eye of the user on the basis of information including the first image, and outputs a determination result as the left/right information in association with the second image. Further, the reason is because the detection unit 14 detects an overlap between a region including left and right eyes in a region of the face template and a region of left and right eyes in the first image, and weights the verification score on the basis of the detection result.

Second Example Embodiment

In the first example embodiment, the weights for authentication of the left and right eyes are the same, but one eye is easy to identify and one eye is difficult to identify since features of the right and left irises are different even for the same person. Since the eye that is easy to identify requires less time for authentication processing and is more accurate in identification, it is possible to perform authentication with higher accuracy in a shorter time by performing the authentication processing using the eye that is easy to identify among right and left eyes. In the second example embodiment, a description is given to an iris authentication device and the like for performing the authentication processing by weighting an eye that is easy to identify.

Iris Authentication Device

Figure 11:
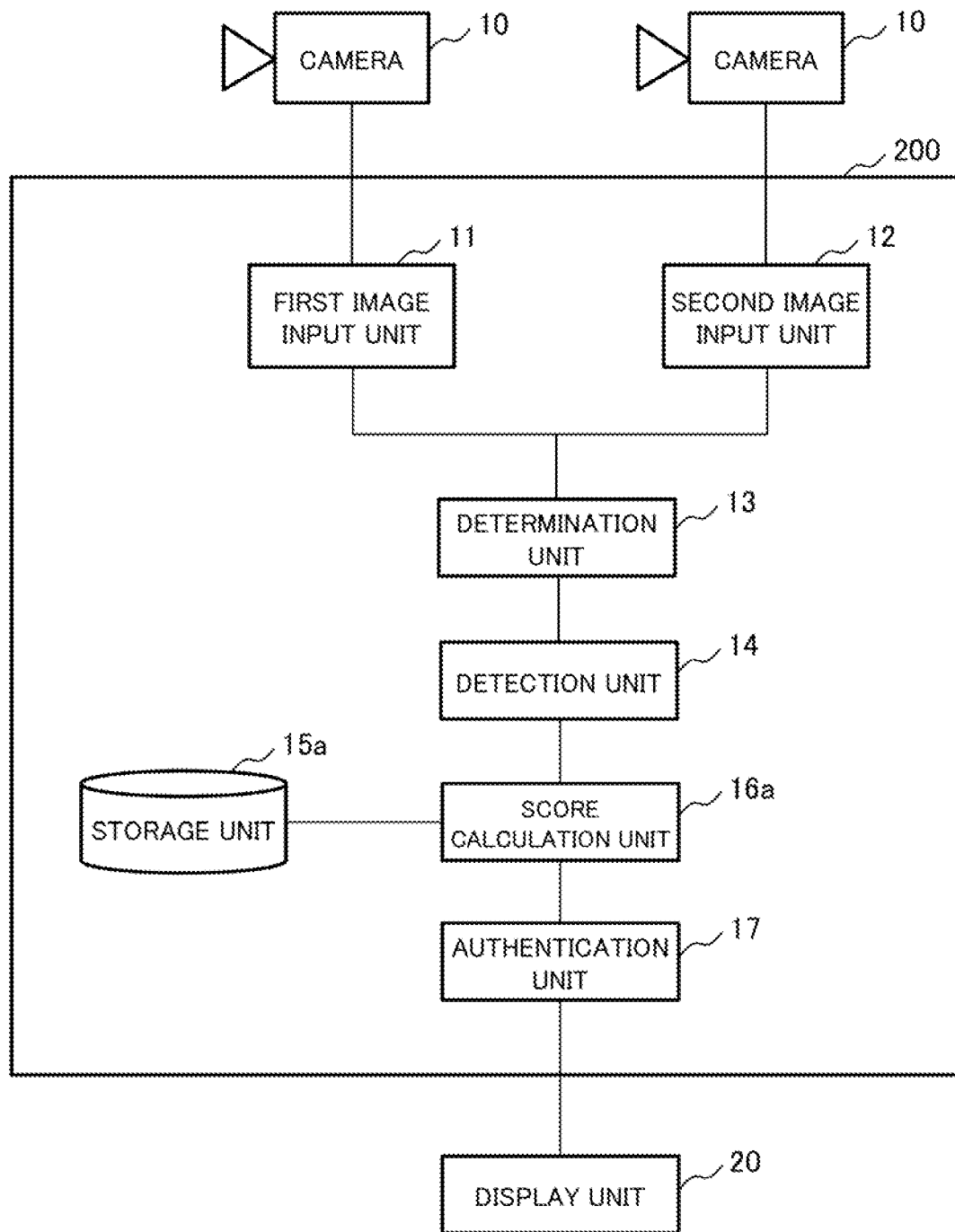
FIG. 11 is a diagram showing a configuration example of an iris authentication device according to a second example embodiment of the disclosure.

As shown in FIG. 11, an iris authentication device 200 includes a first image input unit 11, a second image input unit 12, a determination unit 13, a detection unit 14, a storage unit 15*a*, a score calculation unit 16*a*, and an authentication unit 17. The first image input unit 11 and the second image input unit 12 are connected to an external camera 10. The authentication unit 17 is connected to an external display unit 20.

As shown in FIG. 12, the storage unit 15*a* stores characteristic information and a reliability score of a right eye and characteristic information and a reliability score of a left eye of each user, for each identifier (ID) that is associated with a user to be authenticated and can be identified. The reliability is a value indicating the ease of identification between the target user and other users, and the reliability score represents this value by 0 to 100%. An example of a calculation method of the reliability score will be described. By setting each ID of a registered user stored in a second storage unit 22 as i (i={1, 2, 3, . . . , N}; N is a total number of registered users), characteristic information (a characteristic vector) of an iris image of a right eye of each registered user as $X_{right}$ (i), and characteristic information (a characteristic vector) of an iris image of a right eye of a current target user (a person desired to be collated) as $Y_{right}$, correlation between $X_{right}$ (i) and $Y_{right}$ (for example, normalized cross-correlation) is calculated for all registered users i. After the calculation, calculation is performed on a ratio (=highest correlation value/second correlation value) of the largest correlation value (that is, a correlation value between the same persons (when the target user is hit as a registered user)) to a second correlation value (a correlation value between the person and a registered user who is another person with the highest correlation value), and the calculated value is set as reliability $S_{right}$. Similarly, similar processing is performed for a left eye, and the calculated value is set as reliability $S_{left}$. By normalizing these reliabilities $S_{right}$ and $S_{left}$ and converting to values of 0% to 100%, the reliability score (for example, left eye 20%, right eye 80%) is obtained. While there are various methods for normalizing the reliability, for example, the reliability score (%)=100×(S−1)/(M−1) is calculated (where 1≤S≤M; S represents either $S_{right}$ or $S_{left}$, and M represents a maximum value of the reliability. The maximum value is set in advance by a designer or the like, and the reliability in a case of M<S is 100). The method for calculating the reliability score is not limited to the above. As the reliability score is higher, characteristic information of the target user is easy to be identified (is a rare iris code) as compared with characteristic information of other users. For example, in a case of the user ID "1", the reliability score of the right eye is 80%, and the reliability score of the left eye is 20%, which indicates that an iris of a right eye of the user is distinctive, and there are relatively no users having similar characteristic information. Conversely, it is indicated that an iris of the left eye of the user is not very distinctive, and there are many users having similar characteristic information. In such a case, since it is more efficient to use the right eye for the authentication processing, it is desirable to perform the authentication processing using the second image of the right eye even when the second image of both eyes can be captured. Conversely, if it has been possible to capture the second image of only the left eye for some reason, it can be inferred that this is because the reliability score of the left eye is low even if the verification score of the authentication is low. In this case, the iris authentication device 200 can also request the user to capture the iris image again. Specifically, the iris authentication device 200 requests the user to move again from an entrance gate to an exit gate for authentication again via the display unit 20 or the like. If an eye with a higher reliability score is hidden by hair and the like, the authentication unit 17 may present, to the display unit 20, text or the like requesting cooperation from the user so that the eye having the higher reliability score can be clearly captured by the camera 10.

In addition to the operation of the score calculation unit 16 shown in FIG. 1, the score calculation unit 16*a* performs authentication using a second weighted verification score obtained by adding the reliability score to the verification score. The score calculation unit 16*a* calculates the verification score obtained by comparing iris characteristic information calculated from the second image associated with the left/right information, with one or more pieces of characteristic information related to the left/right information and stored in the storage unit 15*a*. Furthermore, the score calculation unit 16*a* specifies the target user on the basis of the verification score, acquires the reliability score related to the target user from the storage unit 15*a*, and calculates the second weight reference score in which the reliability score is reflected on the calculated verification score. For example, for a user with ID "1" in FIG. 12, a reliability score of the right eye is 80%, and a reliability score of the left eye is 20%. Therefore, when the verification score of the second image of both eyes has been calculated, the score calculation unit 16*a* weights the verification score of the right eye with the reliability score of the right eye, and weights the verification score of the left eye with the reliability score of the left eye. At this time, the score calculation unit 16*a* may increase the priority of the eye having higher reliability, and weight only the verification score of the right eye with the reliability score of the right eye. This enables a score of higher reliability to be obtained. The weighting refers to obtaining a calculation result by multiplying, adding, or substituting both scores into a predetermined formula, for example. The score calculation unit 16*a* transfers the weighted calculation result to the authentication unit 17 as the second weighted verification score.

Operations of the other units are similar to those of the first example embodiment.

Operation of Iris Authentication Device

An operation of the iris authentication device 200 according to the second example embodiment will be described with reference to a flowchart of FIG. 13. It is assumed that the storage unit 15*a* stores, in advance, iris characteristic information and reliability scores (see FIG. 12) of a right eye and a left eye relating to a plurality of users that may be the authentication target.

Figure 10:
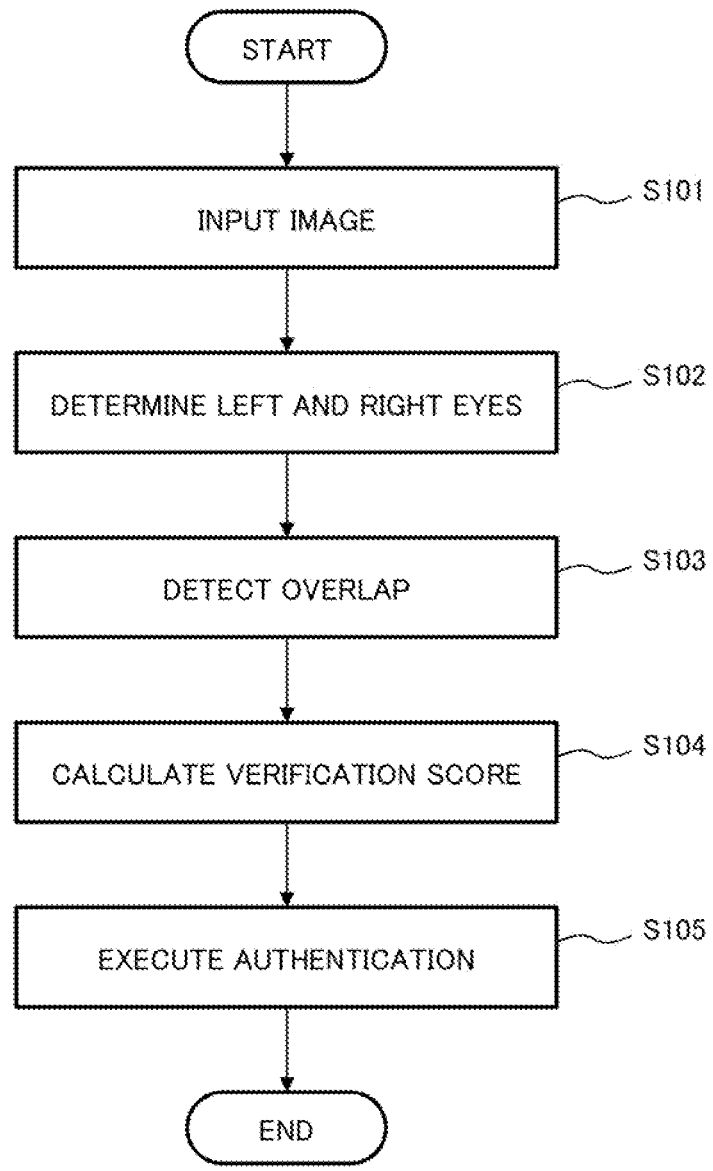
FIG. 10 is a flowchart showing an operation of the iris authentication device according to the first example embodiment of the disclosure.

Steps S201 to S204 are similar to steps S101 to S104 in FIG. 10.

In step S205, the score calculation unit 16*a* specifies the target user from the storage unit 15*a* on the basis of the verification score calculated in step S204, acquires the reliability score related to the target user from the storage unit 15*a*, and weights the calculated verification score with the reliability score. At this time, the score calculation unit 16*a* may give priority to an eye having higher reliability, and weight the verification score of the eye having higher priority with the reliability score of the eye. The score calculation unit 16*a* transfers a second verification score weighted by the reliability score, to the authentication unit 17.

Step S206 is similar to step S105 in FIG. 10.

Thus, the operation of the iris authentication device 200 is ended.

Effect of Second Example Embodiment

According to the second example embodiment, authentication processing with higher accuracy can be performed, in addition to the effects of the first example embodiment. The reason for this is because the score calculation unit 16a specifies the target user from the storage unit 15a on the basis of the calculated verification score, acquires the reliability score related to the target user from the storage unit 15a, and weights the calculated verification score with the reliability score. Further, the reason is because the score calculation unit 16a gives priority to an eye having higher reliability, and weights the verification score of the eye having higher priority with the reliability score of the eye.

Third Example Embodiment

In the first and second example embodiments, only iris authentication using the second image is performed. However, another biometric authentication (human form authentication, gait authentication, face authentication, or the like) may be performed using the first image, and multimodal authentication may be performed by combining results of the two authentications. This can further improve the accuracy of authentication. In a third example embodiment, an iris authentication device and the like for combining another biometric authentication will be described. The human form authentication refers to authentication performed on the basis of physical characteristics (for example, a height, a body width, a length of limbs, a facial contour, or a combination thereof) of a person to be authenticated.

Iris Authentication Device

Figure 14:
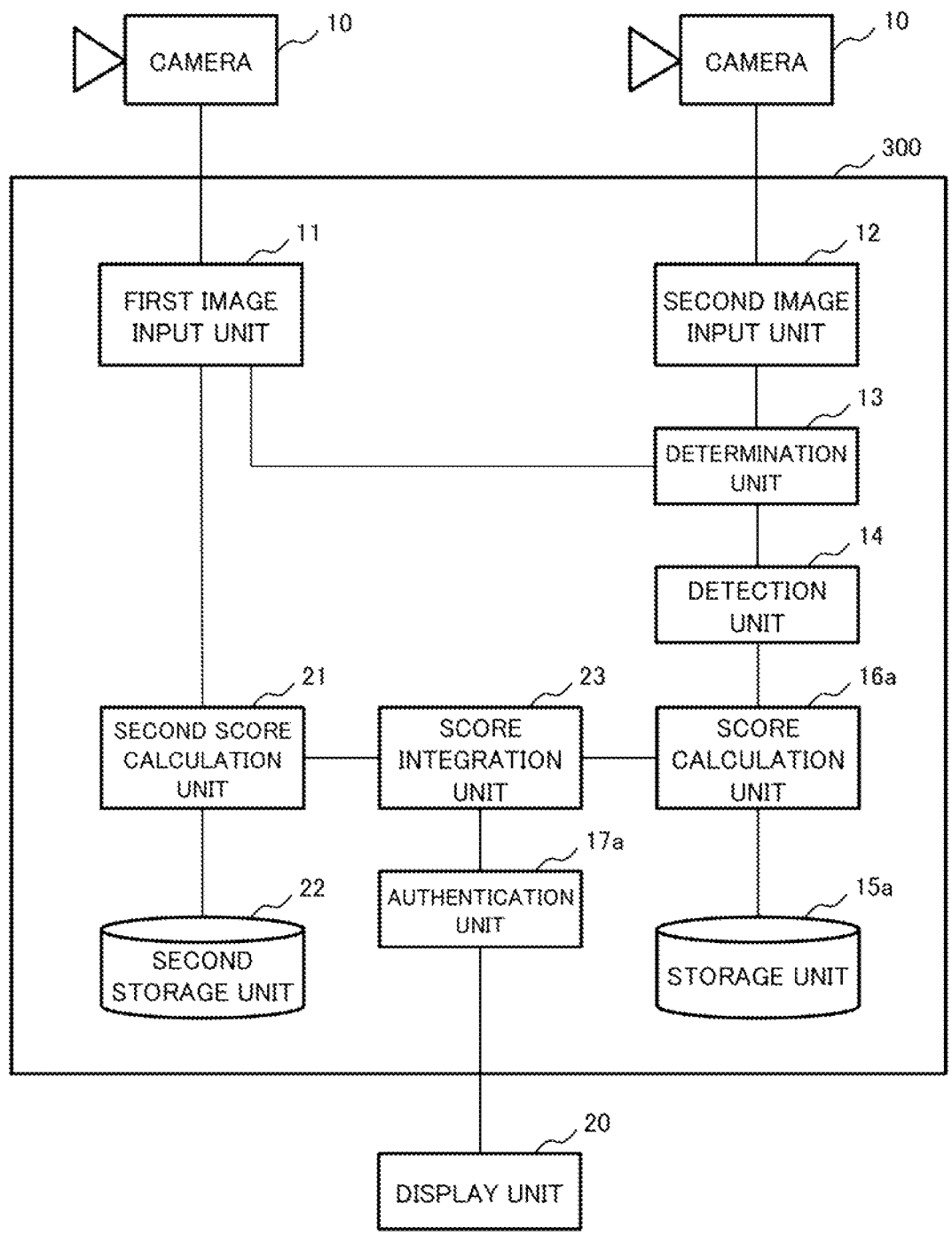
FIG. 14 is a diagram showing a configuration example of an iris authentication device according to a third example embodiment of the disclosure.

An iris authentication device 300 includes, as shown in FIG. 14, a first image input unit 11, a second image input unit 12, a determination unit 13, a detection unit 14, a storage unit 15a, a score calculation unit 16a, an authentication unit 17a, a second score calculation unit 21, a second storage unit 22, and a score integration unit 23. The first image input unit 11 and the second image input unit 12 are connected to an external camera 10. The authentication unit 17a is connected to an external display unit 20.

The second storage unit 22 stores information (characteristic information of a human form, a gait, a face, or the like) to be used for authentication of another biometric authentication (human form authentication, gait authentication, face authentication, or the like) using a first image.

The second score calculation unit 21 calculates characteristic information of a user to be authenticated from the first image as the second verification score, for the other biometric authentication.

The biometric authentication to be used by the second score calculation unit 21 may be initially set or may be set by the user. For example, when the first image is a static image or a moving image obtained by capturing an image of a whole body of the user, the second score calculation unit 21 calculates the second verification score by performing human form authentication using the static image or gait authentication using the moving image. When the first image is an image obtained by capturing an image of a face of the user, the second score calculation unit 21 calculates the second verification score by performing face authentication using the first image.

The score integration unit 23 integrates the second weighted verification score outputted from the score calculation unit 16a with the second verification score outputted from the second score calculation unit 21, and outputs as an integrated score to the authentication unit 17a. In the integration processing, the integrated score is calculated by multiplying, adding, or substituting the weighted verification score and the second verification score into a predetermined formula. The second verification score may be integrated to the first weighted verification score outputted by the score calculation unit 16 shown in FIG. 1.

The authentication unit 17a uses the integrated score to perform authentication processing.

Operations of the other units are similar to those of the first and second example embodiments.

Operation of Iris Authentication Device

Figure 15:
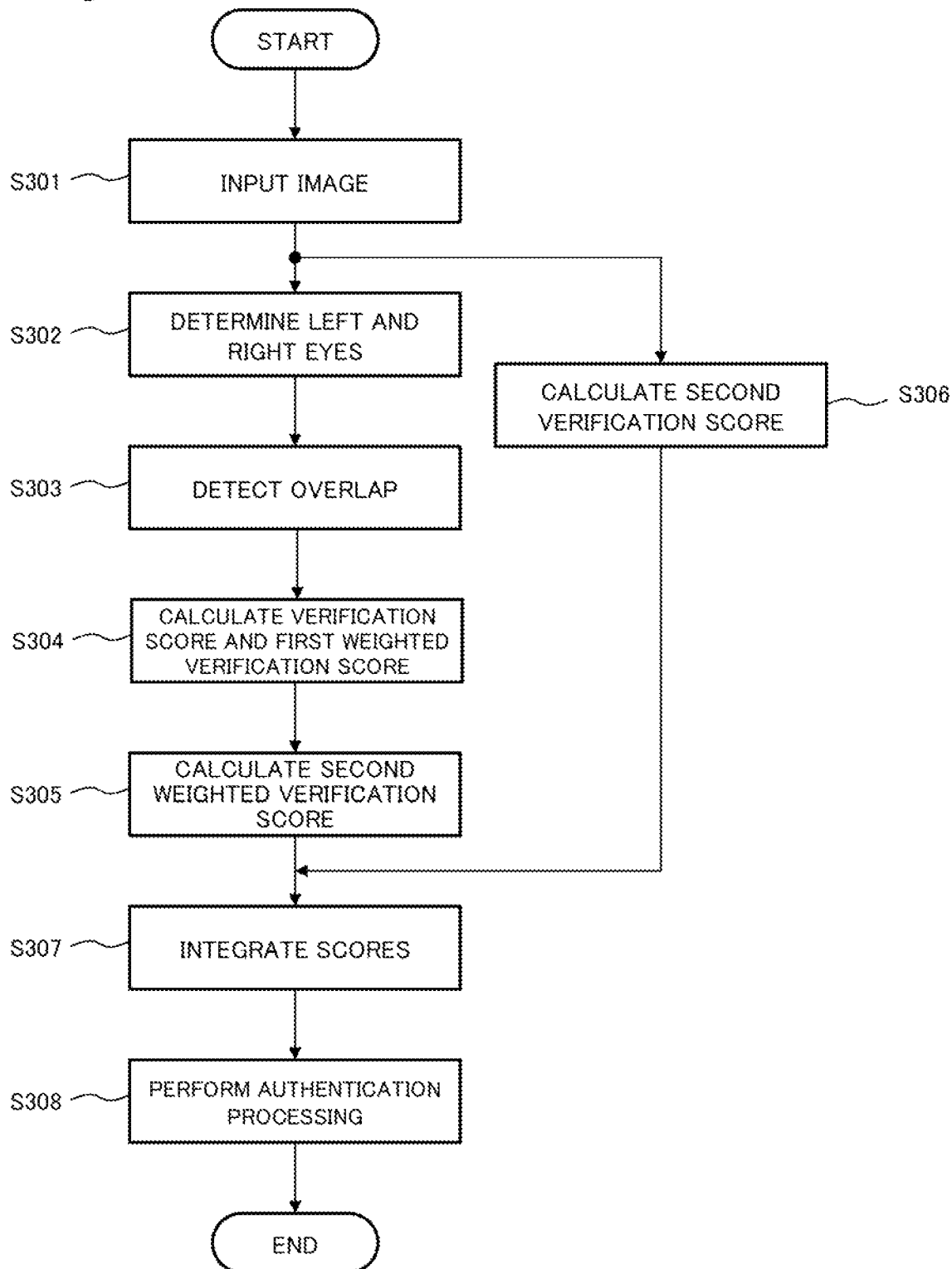
FIG. 15 is a flowchart showing an operation of the iris authentication device according to the third example embodiment of the disclosure.

An operation of the iris authentication device 300 according to the third example embodiment will be described with reference to a flowchart of FIG. 15. The storage unit 15a stores, in advance, iris characteristic information of a right eye and a left eye relating to a plurality of users that may be the authentication target. Further, a reliability score (see FIG. 12) may be stored. The second storage unit 22 stores, in advance, body characteristic information relating to a plurality of users that may be the authentication target.

Figure 13:
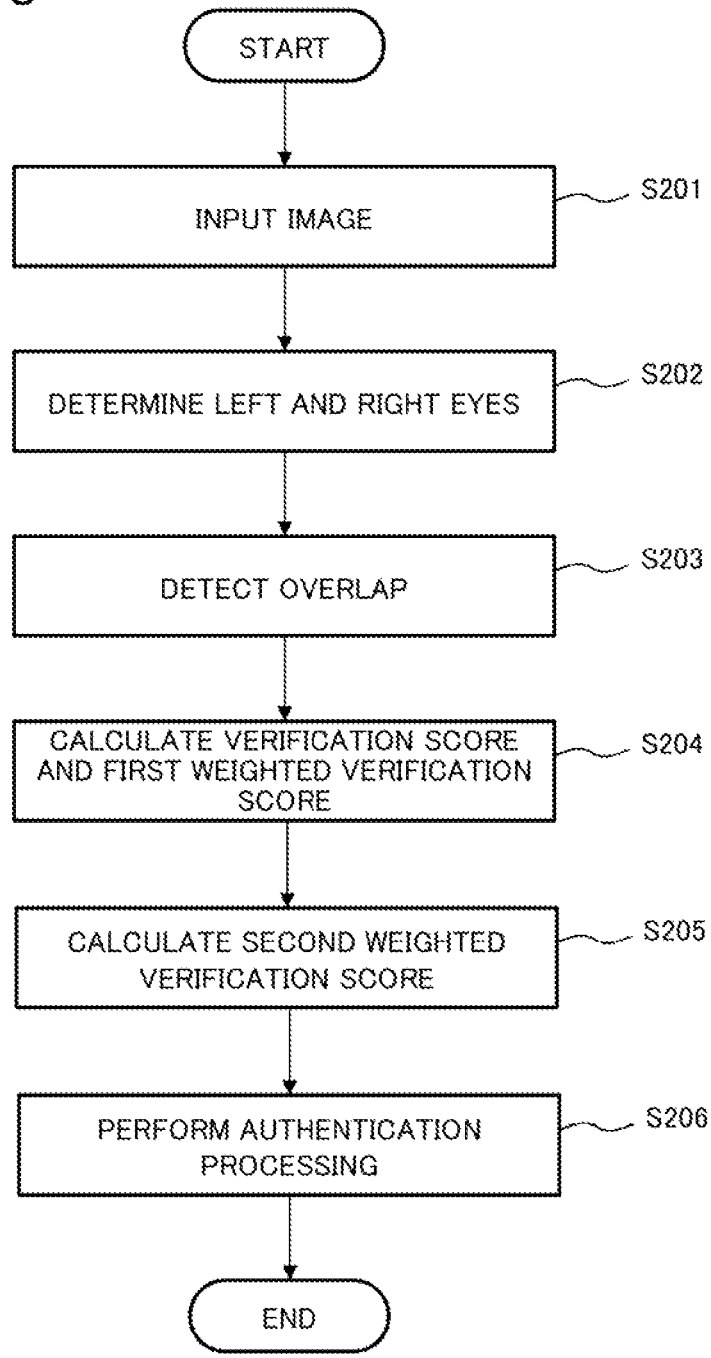
FIG. 13 is a flowchart showing an operation of the iris authentication device according to the second example embodiment of the disclosure.

Steps S301 to S305 are similar to steps S201 to S205 in FIG. 13.

In step S306, the second score calculation unit 21 performs biometric authentication (human form authentication, gait authentication, face authentication, or the like) other than iris authentication by using a first image in which a user's body image is captured, calculates characteristic information of the user's body included in the first image, compares the calculated characteristic information with the characteristic information stored in the second storage unit 22, and outputs a comparison result to the score integration unit 23 as the second verification score.

In step S307, the score integration unit 23 calculates an integrated score obtained by adding the second verification score outputted by the second score calculation unit 21 to the second weighted verification score outputted by the score calculation unit 16a. The score integration unit 23 outputs the calculated integrated score to the authentication unit 17a.

In step S308, the authentication unit 17a authenticates the user captured in the first image and the second image on the basis of the calculated integrated score, and outputs an authentication result. Specifically, the authentication unit 17a authenticates the user captured in the first image and the second image as a registered user (a legitimate user), for example, when the integrated score is equal to or greater than a predetermined threshold, and authenticates the user captured in the first image and the second image as not a registered user when the integrated score is equal to or less than a predetermined threshold value. Then, the authentication unit 17a outputs the authentication result to an external display unit 20.

Thus, the operation of the iris authentication device 300 is ended.

Effect of Third Example Embodiment

According to the third example embodiment, it is possible to provide the iris authentication device 300 having even higher authentication accuracy than the iris authentication devices described in the first to second example embodiments. The reason for this is because the second score calculation unit 21 calculates characteristic information from a body image of the authentication target user included in the first image and outputs the second verification score, the score integration unit 23 calculates an integrated score in which the second verification score is reflected on the second weighted verification score, and the authentication unit 17*a* performs the authentication processing on the basis of this integrated score. The score integration unit 23 may be designed to reflect the second verification score on the first weighted verification score to calculate the integrated score.

Fourth Example Embodiment

In the detection by the detection unit 14, when an image of a moving target user is captured from the camera 10 at a predetermined position, a machine learning engine is made to learn which rectangular region in the first image includes left and right eyes on the basis of teacher data before operation of the iris authentication device, and a designer or the like sets a position of the camera 10 on the basis of a learning result. However, it is desirable to cause the machine learning engine for authentication to learn by using history data after operation of the iris authentication device, and to feed back points to be improved to each part of the iris authentication device.

For example, after operation, the machine learning engine can learn where, what, and how images appear on a screen captured by the fixed camera 10, and a position, an angle, and the like of the camera 10 can be adjusted on the basis of the learning result. This can be learned and adjusted by the machine learning engine on the basis mainly of a history of authentication result data when the authentication is successful.

Even an image captured by the fixed camera 10 may have different authentication accuracy depending on a season and time. For example, authentication accuracy may be high in the morning but authentication accuracy may be low in the afternoon, or authentication accuracy may be high in the daytime but authentication accuracy may be low at night. This is often caused by a change in light applied to the target user while the camera 10 is capturing an image. In addition to this, another possible cause is that types of teacher data used for the learning of the machine learning engine have been biased (for example, only images captured in the morning have been learned). This can be learned and adjusted by the machine learning engine on the basis mainly of a history of authentication result data when the authentication fails.

Depending on a lighting condition of the target user at the time of capturing an image by the camera 10, there is a change in a luminance value of a pixel in a region of a whole body or a face of the user in the first image, and a luminance value of a pixel in a region of left and right eyes of the user in the second image. The light may be outdoor light (sunlight), indoor light (illumination light), or a mixture thereof. Sunlight reaching a ground surface changes in accordance with a season of image capturing and progress of time of image capturing. The indoor light changes with illuminance, orientation, and a type of illumination, as well as addition or reduction of illumination. In a case of authentication in a mixed area of sunlight and indoor light, both should be taken into account. In a fourth example embodiment, a description is given to an iris authentication device and the like for performing feedback adjustment on the basis of a history of authentication result data after operation, as described above.

Iris Authentication Device

Figure 16:
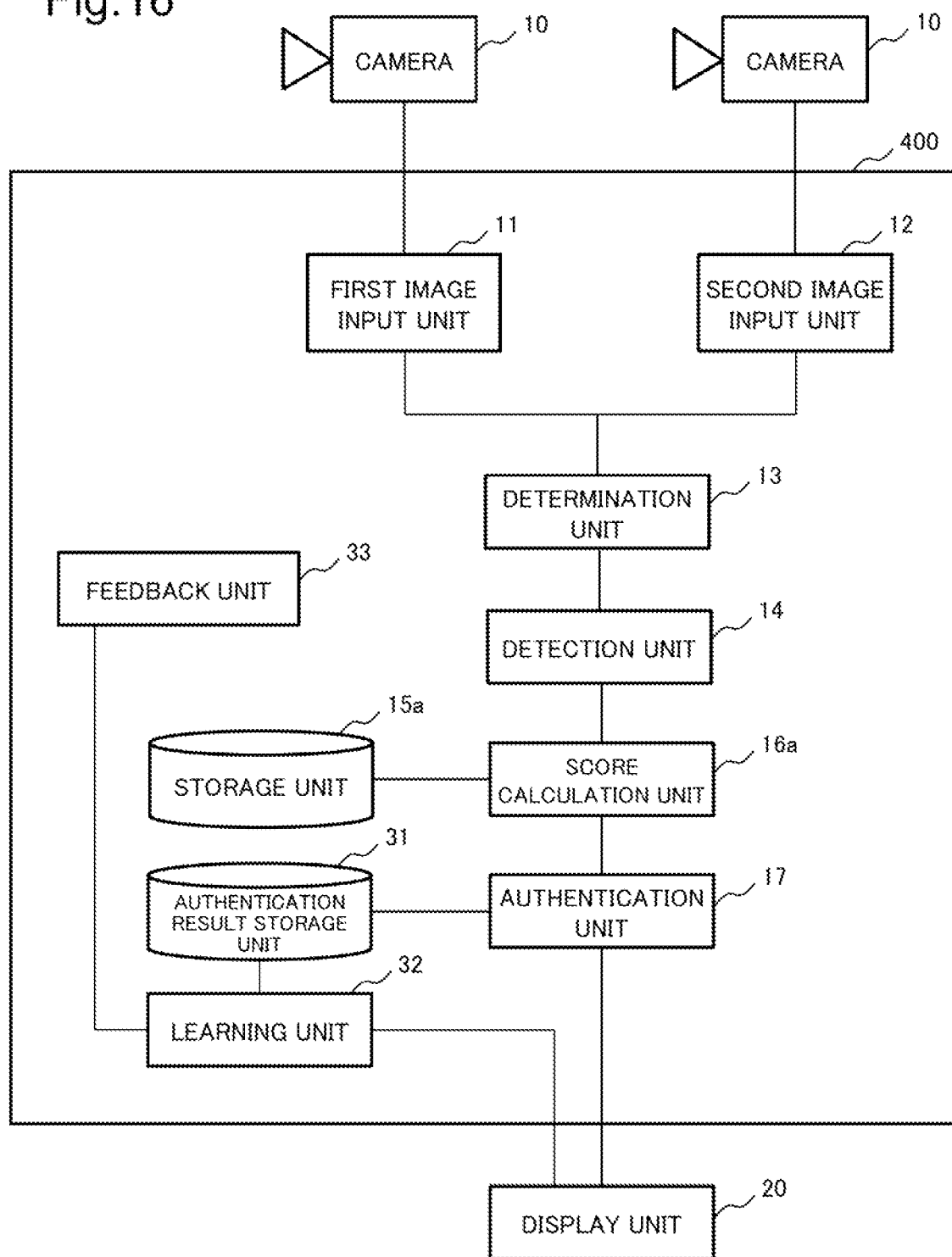
FIG. 16 is a diagram showing a configuration example of an iris authentication device according to a fourth example embodiment of the disclosure.

An iris authentication device 400 includes, as shown in FIG. 16, a first image input unit 11, a second image input unit 12, a determination unit 13, a detection unit 14, a storage unit 15*a*, a score calculation unit 16*a*, an authentication unit 17, an authentication result storage unit 31, a learning unit 32, and a feedback unit 33. The first image input unit 11 and the second image input unit 12 are connected to an external camera 10. The authentication unit 17 is connected to an external display unit 20.

The authentication result storage unit 31 stores authentication result data obtained by the authentication unit 17 (see FIG. 17). The authentication result data includes, as items, for example, an authentication ID, an authentication time, an authentication result, and authentication image data. The authentication ID is an ID for identifying each authentication result. The authentication time is the time when the authentication result is calculated. The authentication result is a code, a value, or the like representing a result of authentication. As shown in FIG. 17, the authentication result indicates "○" for a legitimate user, and "x" for not a legitimate user. These are all authentication success data. When authentication fails but the user is a legitimate user, an ID of the legitimate user is stored (for example, in FIG. 17, an ID "1234" of a legitimate user for the authentication ID "1", and an ID "5678" of a legitimate user for the authentication ID "5"). The ID of the legitimate user is read from a touch panel, a scanner, or the like (not shown) by a user or a manager. When the authentication fails but the user is a legitimate user, the data is to be authentication failure data. A method for specifying the authentication failure data is not limited to the above. For example, when an observer is shown in an image captured by the camera 10, it may be regarded that some trouble has occurred in the authentication processing, and the data may be made authentication failure data. Whether the observer is shown is determined by face authentication of the observer or by authentication of a mark indicating the observer on the observer's clothing (back, an arm, or the like). In addition, by installing an iris authentication device higher in accuracy than the iris authentication device 400 at the same position, authentication failure data can also be extracted by comparing the two authentication result data.

The learning unit 32 learns which rectangular region in a first image includes a pixel indicating a left eye and a right eye, on the basis of the authentication result data extracted from the authentication result storage unit 31. This is for feedback to the detection unit 14 which rectangular region in the first image includes a left eye and a right eye more often.

Further, the learning unit 32 learns characteristics of light included in the first image and a second image, and determines, in a specific period, which of the left eye or the right eye of the target user should be associated with the second image as left/right information. The characteristics of light include a change in a luminance value of a pixel indicating the target user in the first image and the second image. The change in the luminance value includes a change in sunlight along seasonal and time transitions at a particular location, as well as a change in a type of a light source and arrangement of the light source in a room. The learning unit 32 learns how the characteristics of light affect the luminance value of the pixel indicating the target user, and determines the camera 10 to be used for authentication and left and right eyes to be used for authentication for each date and time, on the basis of a learning result.

The learning unit 32 includes a machine learning engine or the like that learns on the basis of authentication result data stored in the authentication result storage unit 31. The learning unit 32 may be designed to be connected to an external machine learning engine and receive results of learning.

Figure 18:
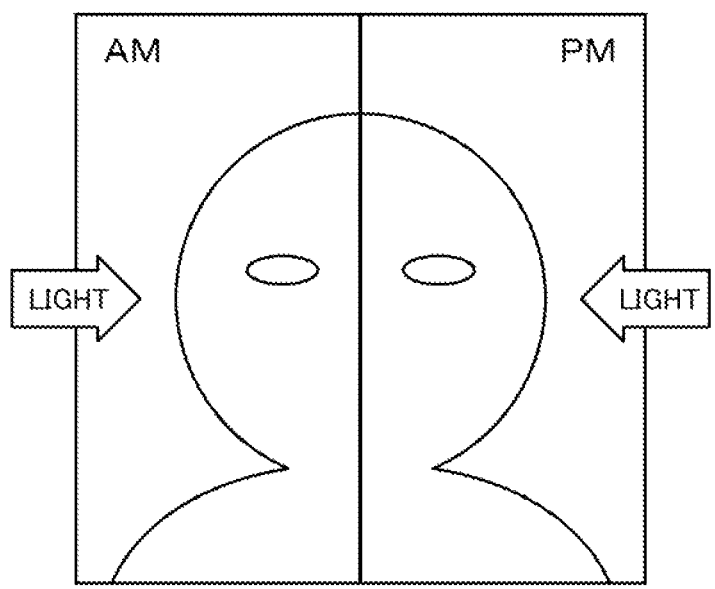
FIG. 18 is a view showing an example of a change in light in the first image.

For example, for obtaining feedback about adjustment of a position or an angle of the camera 10, the learning unit 32 learns on the basis mainly of a history of the authentication success data, and outputs information about a camera position and an angle for accommodating a region of the face of the target user in the first or second image. In a case where there are a plurality of fixed cameras 10, for obtaining feedback on which camera 10 to be used in accordance with a season or time of day, the learning unit 32 learns on the basis mainly of a history of the authentication failure data, and outputs information for determining a video image captured by which camera 10 is suitable, based on a light condition of a current authentication area. Even when iris authentication is performed on the basis of an image captured by the fixed camera 10, the authentication accuracy of the left and right eyes may be changed in the morning and afternoon by a change in sunlight. In such a case, as shown in FIG. 18, the learning unit 32 outputs information that authentication should be performed on the basis of the right eye of the target user in the morning, and authentication should be performed on the basis of the left eye of the target user in the afternoon (it is assumed that target user is moving northward). Further, when the learning unit 32 learns that the authentication accuracy tends to decrease at night due to bias of teacher data of the machine learning engine to be used, the learning unit 32 outputs information on types of teacher data to be additionally learned and the like. The learning unit 32 transfers the learning result to the feedback unit 33, and also displays the learning result on the display unit 20.

On the basis of the learning result, the feedback unit 33 adjusts operations of the camera 10, the first image input unit 11, the second image input unit 12, the determination unit 13, the detection unit 14, the score calculation unit 16a, and the authentication unit 17. An administrator or the like may manually adjust each unit on the basis of the learning result displayed on the display unit 20.

Operations of the other units are similar to those of the first and second example embodiments.

Operation of Iris Authentication Device

Figure 19:
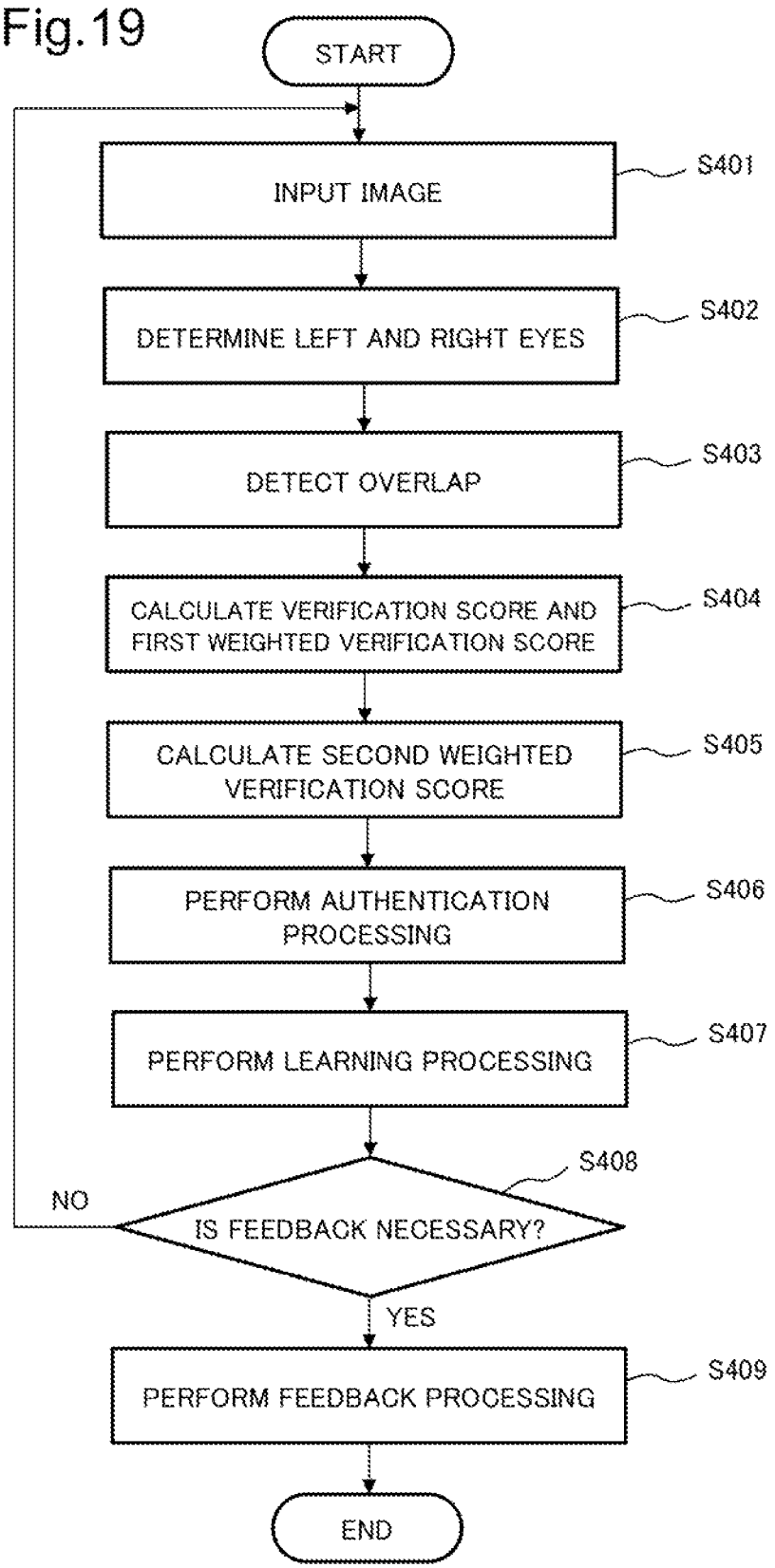
FIG. 19 is a flowchart showing an operation of the iris authentication device according to the fourth example embodiment of the disclosure.

An operation of the iris authentication device 400 according to the fourth example embodiment will be described with reference to a flowchart of FIG. 19. It is assumed that the storage unit 15a stores, in advance, iris characteristic information and reliability scores (see FIG. 12) of a right eye and a left eye relating to a plurality of users that may be the authentication target.

Steps S401 to S406 are similar to steps S201 to S206 in FIG. 13.

In step S407, the learning unit 32 learns which rectangular region in the first image includes a pixel indicating a left eye and a right eye, on the basis of the authentication result data extracted from the authentication result storage unit 31. Further, the learning unit 32 learns characteristics of light included in the first image, and determines, in a specific period, which of the left eye or the right eye of the target user should be associated with the second image as left/right information. This learning may be performed after the authentication result data is accumulated up to a predetermined amount.

In step S408, the learning unit 32 determines whether the learning result should be presented to the display unit 20, or fed back to each unit of the iris authentication device 400. The designer may determine in advance, or the learning unit 32 may determine with what kind of trigger or timing the feedback should be made. When it is determined that feedback should be made, the process proceeds to step S409, and when it is determined that feedback should not be made yet, the process returns to step S401.

In step S408, when receiving the learning result from the learning unit 32, the feedback unit 33 feeds back the learning result to each unit of the iris authentication device 400 to urge adjustment as appropriate.

Thus, the operation of the iris authentication device 400 is ended.

Effect of Fourth Example Embodiment

According to the fourth example embodiment, authentication processing with higher accuracy can be performed, in addition to the effects of the first and second example embodiments. The reason for this is because the learning unit 32 learns, on the basis of the history of the authentication result data, which rectangular region in the first image includes a pixel indicating a left eye and a right eye, and learns characteristics of light included in the first and second images. Further, the learning result is fed back to each unit of the iris authentication device 400. This enables authentication with higher accuracy to be performed in accordance with operation of the iris authentication device.

Meanwhile, the example embodiments each may be used in combination.

Information Processing Apparatus

Figure 20:
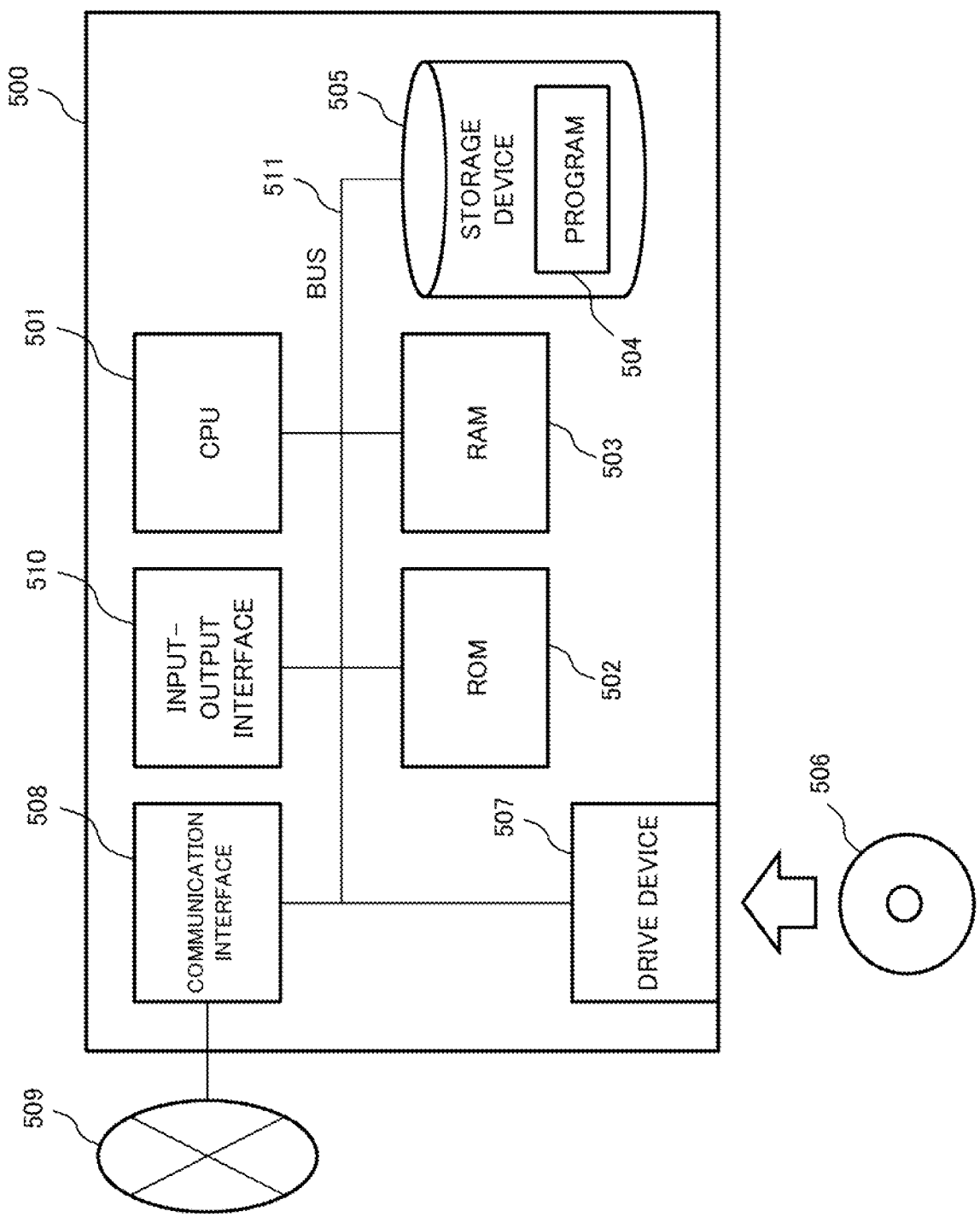
FIG. 20 is a configuration diagram of an information processing apparatus usable in the first to fourth example embodiments.

In each of the example embodiments described above, some or all of the individual components of the iris authentication device shown in FIGS. 1, 11, 14, 16, and the like may be implemented by using any combination of, for example, an information processing apparatus 500 as shown in FIG. 20 and a program. The information processing apparatus 500 includes, as an example, the following configuration.

A central processing unit (CPU) 501
A read only memory (ROM) 502
A random access memory (RAM) 503
A storage device 505 that stores a program 504 and other data
A drive device 507 that reads from and writes into a recording medium 506
A communication interface 508 that connects to a communication network 509
An input-output interface 510 to input and output data
A bus 511 that connects individual components Individual components of the iris authentication device in each example embodiment of the application are implemented by the CPU 501 obtaining and executing the program 504 for achieving these functions. The program 504 for achieving the functions of the individual components of the iris authentication device is stored in advance, for example, in the storage device 505 or the RAM 503, and is read out by the CPU 501, as necessary. The program 504 may be supplied via the communication network 509 to the CPU 501, or may be stored in advance in the recording medium 506 and supplied to the CPU 501 by the drive device 507 reading out the program.

There are various modifications for a method of implementing each device. For example, the iris authentication device may be implemented by any combination of an information processing apparatus and a program that are separate for each component. Further, a plurality of components included in the iris authentication device may be implemented by any combination of one information processing apparatus 500 and a program.

Furthermore, some or all of the individual components of the iris authentication device may be implemented by other general-purpose or dedicated circuit, processor, and the like, or a combination thereof. These may be configured by a single chip or a plurality of chips connected via a bus.

Some or all of the individual components of the iris authentication device may be implemented by a combination of the above-described circuit and the like and a program.

In a case where some or all of the individual components of the iris authentication device are implemented by a plurality of information processing apparatuses, circuits, and the like, the plurality of information processing apparatuses, circuits, and the like, may be centrally arranged or dispersedly arranged. For example, the information processing apparatus, the circuit, and the like may be implemented as a form in which each is connected via a communication network, such as a client and server system, a cloud computing system, and the like.

The whole or part of the example embodiments disclosed above can be described as, but not limited to, the following supplementary notes.

[Supplementary Note 1]

An iris authentication device comprising:

a first image input means for inputting a first image obtained by capturing an image of an authentication target that moves in a specific direction;

a second image input means for inputting, for at least one eye, a second image obtained by capturing an image of a right eye or a left eye of the target;

a determination means for determining whether the second image is of a left eye or a right eye of the target on the basis of information including the first image, and outputting a determination result as left/right information in association with the second image;

a detection means for detecting an overlap between a region including the second image and a predetermined region in the first image;

a storage means for storing iris characteristic information of a right eye and a left eye relating to one or more targets to be authenticated;

a score calculation means for calculating a verification score by comparing iris characteristic information calculated from the second image associated to the left/right information, with one or more pieces of characteristic information that are related to the left/right information and stored in the storage means, and calculating a first weighted verification score obtained by weighting the calculated verification score with a result of the detection; and an authentication means for authenticating a target captured in the second image on the basis of the calculated first weighted verification score, and outputting an authentication result.

[Supplementary Note 2]

The iris authentication device described in Supplementary Note 1, in which the storage means stores a reliability score of a right eye and a left eye relating to the targets to be authenticated, the score calculation means specifies the target on the basis of the verification score, acquires the reliability score related to the target from the storage means, and calculates a second weighted verification score obtained by weighting the verification score with the reliability score.

[Supplementary Note 3]

The iris authentication device described in Supplementary Note 1 or 2, in which the score calculation means calculates the second weighted verification score with priority given to an eye having a higher value indicating the reliability score.

[Supplementary Note 4]

The iris authentication device according to any one of Supplementary Notes 1 to 3, further comprising:

a second storage means for storing characteristic information calculated from a body image of one or more targets to be authenticated;

a second score calculation means for calculating characteristic information from a body image of the target included in the first image acquired from the first image input means, comparing the calculated characteristic information with characteristic information stored in the second storage means, and outputting a comparison result as a second verification score; and a score integration means for calculating an integrated score reflecting the second verification score outputted by the second score calculation means on the first weighted verification score or the second weighted verification score outputted by the score calculation means, in which the authentication means authenticates the target captured in the second image on the basis of the first weighted verification score, the second weighted verification score, or the integrated score, and outputs an authentication result.

[Supplementary Note 5]

The iris authentication device described in Supplementary Note 4, in which the first image is a static image or a moving image obtained by capturing an image of a whole body of the target, and the second score calculation means calculates characteristic information of the body image by executing human form authentication using the static image or gait authentication using the moving image.

[Supplementary Note 6]

The iris authentication device described in Supplementary Note 4, in which the first image is an image obtained by capturing an image of a face of the target, and the second score calculation means calculates characteristic information of the body image by executing face authentication using the first image.

[Supplementary Note 7]

The iris authentication device described in Supplementary Note 1, in which the determination means applies a predetermined template to a region of a face of the target in the first image, and determines whether the two images are relevant to a left eye or a right eye of the target.

[Supplementary Note 8]

The iris authentication device described in Supplementary Note 1, in which the determination means compares a pixel in a region of a right eye and a left eye of the target in the first image with a pixel in a region of a right eye or a left eye of the target in the second image, and determines whether the two images are relevant to a left eye or a right eye of the target.

[Supplementary Note 9]

The iris authentication device described in Supplementary Note 1, in which the predetermined region is one region in the first image divided into a plurality of regions, the iris authentication device further comprising:

an authentication result storage means for storing data of the authentication result; and a learning means for learning which of the regions in the first image includes a pixel indicating a left eye and a right eye on the basis of data of the authentication result extracted from the authentication result storage means, and setting, as the predetermined region, each of a region of a left eye and a region of a right eye that have been learned.

[Supplementary Note 10]

The iris authentication device described in Supplementary Note 9, in which the learning means learns characteristics of light included in the first image and the second image on the basis of data of the authentication result extracted from the authentication result storage means, and determines which of a left eye or a right eye of the target should be associated with the second image as the left/right information in a specific period.

[Supplementary Note 11]

The iris authentication device described in Supplementary Note 10, in which the characteristics of light include a change in a luminance value of a pixel indicating a user as the target in the first image and the second image.

[Supplementary Note 12]

The iris authentication device described in Supplementary Note 11, in which a change in the luminance value includes a change in sunlight along seasonal and time transitions at the particular location, as well as a change in a type of a light source and arrangement of the light source in a room.

[Supplementary Note 13]

An iris authentication method comprising:

inputting a first image obtained by capturing an image of an authentication target that moves in a specific direction;

inputting, for at least one eye, a second image obtained by capturing an image of a right eye or a left eye of the target;

determining whether the second image is of a left eye or a right eye of the target on the basis of information including the first image, and outputting a determination result as left/right information in association with the second image;

detecting an overlap between a region including the second image and a predetermined region in the first image;

calculating a verification score by comparing one or more pieces of characteristic information that are related to the left/right information and acquired from a storage means for storing iris characteristic information of a right eye and a left eye relating to one or more targets to be authenticated, with iris characteristic information calculated from the second image associated to the left/right information, and calculating a first weighted verification score obtained by weighting the calculated verification score with a result of the detection; and authenticating a target captured in the second image on the basis of the calculated first weighted verification score, and outputting an authentication result.

[Supplementary Note 14]

The iris authentication method described in Supplementary Note 13, in which the storage means stores a reliability score of a right eye and a left eye relating to the targets to be authenticated, and in calculating the first weighted verification score, the target is specified on the basis of the verification score, the reliability score related to the target is acquired from the storage means, and a second weighted verification score obtained by weighting the verification score with the reliability score is calculated.

[Supplementary Note 15]

The iris authentication method described in Supplementary Note 13 or 14, in which in calculating the first weighted verification score, the second weighted verification score is calculated with priority given to an eye having a higher value indicating the reliability score.

[Supplementary Note 16]

The iris authentication method described in any one of Supplementary Notes 13 to 15, further comprising:

calculating characteristic information from a body image of the target included in the acquired first image, comparing the calculated characteristic information with characteristic information stored in a second storage means for storing characteristic information calculated from a body image of one or more targets to be authenticated, and outputting a comparison result as a second verification score; and calculating, in calculating the first weighted verification score, an integrated score reflecting the second verification score on the first weighted verification score or the second weighted verification score, in which authenticating the target and outputting an authentication result include authenticating a target captured in the second image on the basis of the first weighted verification score, the second weighted verification score, or the integrated score, and outputting an authentication result.

[Supplementary Note 17]

The iris authentication method described in Supplementary Note 16, in which the first image is a static image or a moving image obtained by capturing an image of a whole body of the target, and outputting the comparison result as a second verification score includes calculating characteristic information of the body image by executing human form authentication using the static image or gait authentication using the moving image.

[Supplementary Note 18]

The iris authentication method described in Supplementary Note 16, in which the first image is an image obtained by capturing an image of a face of the target, and outputting the comparison result as a second verification score includes calculating characteristic information of the body image by executing face authentication using the first image.

[Supplementary Note 19]

The iris authentication method described in Supplementary Note 13, in which in outputting the determination result as left/right information in association with the second image, a predetermined template is applied to a region of a face of the target in the first image, and it is determined whether the two images are relevant to a left eye or a right eye of the target.

[Supplementary Note 20]

The iris authentication method described in Supplementary Note 13, in which in outputting the determination result as left/right information in association with the second image, a pixel in a region of a right eye and a left eye of the target in the first image is compared with a pixel in a region of a right eye or a left eye of the target in the second image, and it is determined whether the two images are relevant to a left eye or a right eye of the target.

[Supplementary Note 21]

The iris authentication method described in Supplementary Note 13, in which the predetermined region is one region in the first image divided into a plurality of regions, the iris authentication method further comprising:

learning which of the regions in the first image includes a pixel indicating a left eye and a right eye on the basis of data of the authentication result extracted from an authentication result storage means for storing data of the authentication result, and setting, as the predetermined region, each of a region of a left eye and a region of a right eye that have been learned.

[Supplementary Note 22]

The iris authentication method described in Supplementary Note 21, in which the learning includes learning characteristics of light included in the first image and the second image on the basis of data of the authentication result extracted from the authentication result storage means, and determining which of a left eye or a right eye of the target should be associated with the second image as the left/right information in a specific period.

[Supplementary Note 23]

The iris authentication method described in Supplementary Note 22, in which the characteristics of light includes a change in a luminance value of a pixel indicating a user as the target in the first image and the second image.

[Supplementary Note 24]

The iris authentication method described in Supplementary Note 23, in which a change in the luminance value includes a change in sunlight along seasonal and time transitions at the particular location, as well as a change in a type of a light source and arrangement of the light source in a room.

[Supplementary Note 25]

A recording medium storing an iris authentication program for causing a computer to enable:

inputting a first image obtained by capturing an image of an authentication target that moves in a specific direction;

inputting, for at least one eye, a second image obtained by capturing an image of a right eye or a left eye of the target;

determining whether the second image is of a left eye or a right eye of the target on the basis of information including the first image, and outputting a determination result as left/right information in association with the second image;

detecting an overlap between a region including the second image and a predetermined region in the first image;

calculating a verification score by comparing one or more pieces of characteristic information that are related to the left/right information and acquired from a storage means for storing iris characteristic information of a right eye and a left eye relating to one or more targets to be authenticated, with iris characteristic information calculated from the second image associated to the left/right information, and calculating a first weighted verification score obtained by weighting the calculated verification score with a result of the detection; and authenticating a target captured in the second image on the basis of the calculated first weighted verification score, and outputting an authentication result.

[Supplementary Note 26]

The recording medium as described in Supplementary Note 25, in which the storage means stores a reliability score of a right eye and a left eye relating to the targets to be authenticated, in calculating the first weighted verification score, the target is specified on the basis of the verification score, the reliability score related to the target is acquired from the storage means, and a second weighted verification score obtained by weighting the verification score with the reliability score is calculated.

[Supplementary Note 27]

The recording medium as described in Supplementary Note 25 or 26, in which in calculating the first weighted verification score, the second weighted verification score is calculated with priority given to an eye having a higher value indicating the reliability score.

[Supplementary Note 28]

The recording medium as described in any one of Supplementary Notes 25 to 27, the iris authentication program further comprising:

calculating characteristic information from a body image of the target included in the first image acquired from the first image input means, comparing the calculated characteristic information with characteristic information stored in a second storage means for storing characteristic information calculated from a body image of one or more targets to be authenticated, and outputting a comparison result as a second verification score; and calculating, in calculating the first weighted verification score, an integrated score reflecting the second verification score on the first weighted verification score or the second weighted verification score, in which authenticating the target and outputting an authentication result include authenticating a target captured in the second image on the basis of the first weighted verification score, the second weighted verification score, or the integrated score, and outputting an authentication result.

[Supplementary Note 29]

The recording medium as described in Supplementary Note 28, in which the first image is a static image or a moving image obtained by capturing an image of a whole body of the target, and outputting the comparison result as a second verification score includes calculating characteristic information of the body image by executing human form authentication using the static image or gait authentication using the moving image.

[Supplementary Note 30]

The recording medium as described in Supplementary Note 28, in which the first image is an image obtained by capturing an image of a face of the target, and outputting the comparison result as a second verification score includes calculating characteristic information of the body image by executing face authentication using the first image.

[Supplementary Note 31]

The recording medium as described in Supplementary Note 25, in which in outputting the determination result as left/right information in association with the second image, a predetermined template is applied to a region of a face of the target in the first image, and it is determined whether the two images are relevant to a left eye or a right eye of the target.

[Supplementary Note 32]

The recording medium as described in Supplementary Note 25, in which in outputting the determination result as left/right information in association with the second image, a pixel in a region of a right eye and a left eye of the target in the first image is compared with a pixel in a region of a right eye or a left eye of the target in the second image, and it is determined whether the two images are relevant to a left eye or a right eye of the target.

[Supplementary Note 33]

The recording medium as described in Supplementary Note 25, in which the predetermined region is one region in the first image divided into a plurality of regions, the iris authentication program further comprising:

learning which of the regions in the first image includes a pixel indicating a left eye and a right eye on the basis of data of the authentication result extracted from an authentication result storage means for storing data of the authentication result, and setting, as the predetermined region, each of a region of a left eye and a region of a right eye that have been learned.

[Supplementary Note 34]

The recording medium as described in Supplementary Note 33, in which the learning includes learning characteristics of light included in the first image and the second image on the basis of data of the authentication result extracted from the authentication result storage means, and determining which of a left eye or a right eye of the target should be associated with the second image as the left/right information in a specific period.

[Supplementary Note 35]

The recording medium as described in Supplementary Note 34, in which the characteristics of light include a change in a luminance value of a pixel indicating a user as the target in the first image and the second image.

[Supplementary Note 36]

The recording medium as described in Supplementary Note 35, in which a change in the luminance value includes a change in sunlight along seasonal and time transitions at the particular location, as well as a change in a type of a light source and arrangement of the light source in a room.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the example embodiments as defined by the claims.

REFERENCE SIGNS LIST 10 camera
11 first image input unit
12 second image input unit
13 determination unit
14 detection unit
15 storage unit
15a storage unit
16 score calculation unit
16a score calculation unit
17 authentication unit
17a authentication unit
20 display unit
21 second score calculation unit
22 second storage unit
23 score integration unit
31 authentication result storage unit
32 learning unit
33 feedback unit
100 iris authentication device
200 iris authentication device
300 iris authentication device
400 iris authentication device
500 information processing apparatus
501 CPU
503 RAM
504 program
505 storage device
506 recording medium
507 drive device
508 communication interface
509 communication network
510 input-output interface
511 bus
507 drive device
508 communication interface
509 communication network
510 input-output interface
511 bus

The invention claimed is:

1. An iris authentication device comprising one or more memories storing instructions and one or more processors configured to execute the instructions to:

input a first image obtained by capturing an image of an authentication target that moves in a specific direction;

input, for at least one eye, a second image obtained by capturing an image of a right eye or a left eye of the target;

determine whether the second image is of a left eye or a right eye of the target based on information including the first image, and output a determination result as left/right information in association with the second image;

detect an overlap between a region including the second image and a predetermined region in the first image;

calculate a verification score by comparing iris characteristic information calculated from the second image associated to the left/right information, with one or more pieces of characteristic information that are related to the left/right information and stored in a memory for storing iris characteristic information of a right eye and a left eye relating to one or more targets to be authenticated, and calculate a first weighted verification score obtained by weighting the calculated verification score with a result of the detection; and authenticate a target captured in the second image based on the calculated first weighted verification score, and output an authentication result.

2. The iris authentication device according to claim 1, wherein the memory stores a reliability score of a right eye and a left eye relating to the targets to be authenticated, and wherein the one or more processors are configured to execute the instructions to specify the target based on the verification score, acquire the reliability score related to the target from the memory, and calculate a second weighted verification score obtained by weighting the verification score with the reliability score.

3. The iris authentication device according to claim 2, wherein the one or more processors are configured to execute the instructions to calculate the second weighted verification score with priority given to an eye having a higher value indicating the reliability score.

4. The iris authentication device according to claim 2, wherein
the one or more processors are configured to execute the instructions to:
calculate characteristic information from a body image of the target included in the first image, compare the calculated characteristic information with characteristic information stored in a second memory for storing characteristic information calculated from a body image of one or more targets to be authenticated, and output a comparison result as a second verification score;
calculate an integrated score reflecting the second verification score outputted on the first weighted verification score or the second weighted verification score outputted; and
authenticate the target captured in the second image based on the first weighted verification score, the second weighted verification score, or the integrated score, and outputs an authentication result.

5. The iris authentication device according to claim 4, wherein the first image is a static image or a moving image obtained by capturing an image of a whole body of the target, and
wherein the one or more processors are configured to execute the instructions to calculate characteristic information of the body image by executing human form authentication using the static image or gait authentication using the moving image.

6. The iris authentication device according to claim 4, wherein the first image is an image obtained by capturing an image of a face of the target, and
wherein the one or more processors are configured to execute the instructions to calculate characteristic information of the body image by executing face authentication using the first image.

7. The iris authentication device according to claim 1, wherein the one or more processors are configured to execute the instructions to apply a predetermined template to a region of a face of the target in the first image, and determine whether the second image is relevant to a left eye or a right eye of the target.

8. The iris authentication device according to claim 1, wherein the one or more processors are configured to execute the instructions to compare a pixel in a region of a right eye and a left eye of the target in the first image with a pixel in a region of a right eye or a left eye of the target in the second image, and determine whether the second image is relevant to a left eye or a right eye of the target.

9. The iris authentication device according to claim 1, wherein the predetermined region is one region in the first image divided into a plurality of regions, and
wherein the one or more processors are configured to execute the instructions to learn which of the regions in the first image includes a pixel indicating a left eye and a right eye based on data of the authentication result extracted from an authentication result memory for storing data of the authentication result, and set, as the predetermined region, each of a region of a left eye and a region of a right eye that have been learned.

10. The iris authentication device according to claim 9, wherein the one or more processors are configured to execute the instructions to learn characteristics of light included in the first image and the second image based on data of the authentication result extracted from the authentication result memory, and determine which of a left eye or a right eye of the target should be associated with the second image as the left/right information in a specific period.

11. The iris authentication device according to claim 10, wherein
the characteristics of light include a change in a luminance value of a pixel indicating the target in the first image and the second image.

12. The iris authentication device according to claim 11, wherein
a change in the luminance value includes a change in sunlight along seasonal and time transitions at a particular location, as well as a change in a type of a light source and arrangement of the light source in a room.

13. An iris authentication method comprising:
inputting a first image obtained by capturing an image of an authentication target that moves in a specific direction;
inputting, for at least one eye, a second image obtained by capturing an image of a right eye or a left eye of the target;
determining whether the second image is of a left eye or a right eye of the target based on information including the first image, and outputting a determination result as left/right information in association with the second image;
detecting an overlap between a region including the second image and a predetermined region in the first image;
calculating a verification score by comparing one or more pieces of characteristic information that are related to the left/right information and acquired from a memory for storing iris characteristic information of a right eye and a left eye relating to one or more targets to be authenticated, with iris characteristic information calculated from the second image associated to the left/right information, and calculating a first weighted verification score obtained by weighting the calculated verification score with a result of the detection; and
authenticating a target captured in the second image based on the calculated first weighted verification score, and outputting an authentication result.

14. A non-transitory computer readable medium recorded with an iris authentication program for causing a computer to enable: inputting a first image obtained by capturing an image of an authentication target that moves in a specific direction; inputting, for at least one eye, a second image obtained by capturing an image of a right eye or a left eye of the target; determining whether the second image is of a left eye or a right eye of the target based on information including the first image, and outputting a determination result as left/right information in association with the second image; detecting an overlap between a region including the second image and a predetermined region in the first image; calculating a verification score by comparing one or more pieces of characteristic information that are related to the left/right information and acquired from a memory for storing iris characteristic information of a right eye and a left eye relating to one or more targets to be authenticated, with iris characteristic information calculated from the second image associated to the left/right information, and calculating a first weighted verification score obtained by weighting the calculated verification score with a result of the detection; and authenticating a target captured in the second image based on the calculated first weighted verification score, and outputting an authentication result.

* * * * *